United States Patent
Takanashi

(10) Patent No.: US 11,798,445 B2
(45) Date of Patent: Oct. 24, 2023

(54) IMAGE PROCESSING APPARATUS HAVING LIGHT-SHIELDING PLATE, PROJECTION-TYPE DISPLAY APPARATUS, IMAGE PROCESSING METHOD, AND STORAGE MEDIUM TO CORRECT LUMINANCE OR COLOR OF IMAGE SIGNAL

(71) Applicant: CANON KABUSHIKI KAISHA, Tokyo (JP)

(72) Inventor: Ikuo Takanashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/713,070

(22) Filed: Apr. 4, 2022

(65) Prior Publication Data
US 2022/0327972 A1    Oct. 13, 2022

(30) Foreign Application Priority Data
Apr. 8, 2021    (JP) .................................. 2021-065726

(51) Int. Cl.
*G09G 3/00*        (2006.01)
(52) U.S. Cl.
CPC ..... *G09G 3/002* (2013.01); *G09G 2320/0233* (2013.01); *G09G 2320/0242* (2013.01); *G09G 2354/00* (2013.01)
(58) Field of Classification Search
CPC ........... G09G 3/002; G09G 2320/0233; G09G 2320/0242; G09G 2354/00
See application file for complete search history.

(56) References Cited

U.S. PATENT DOCUMENTS

| | | | | |
|---|---|---|---|---|
| 2002/0057361 A1* | 5/2002 | Mayer, III | ........... | G03B 21/005 348/383 |
| 2010/0117929 A1* | 5/2010 | Fujimori | ............... | G06F 3/1446 345/1.3 |
| 2010/0201702 A1* | 8/2010 | Franik | .................... | G09G 3/001 345/589 |

(Continued)

FOREIGN PATENT DOCUMENTS

JP    3965818 B2    9/2000

*Primary Examiner* — Benjamin C Lee
*Assistant Examiner* — Emily J Frank
(74) *Attorney, Agent, or Firm* — CANON U.S.A., INC. IP Division

(57) ABSTRACT

An image processing apparatus includes at least one processor and a memory containing instructions that are configured to cause the at least one processor to perform operations including a correction task configured to correct an image signal that has been input to the first projection-type display apparatus. The first projection image includes a first area which part of the second projection image overlaps, a second area that is adjacent to the first area and affected by the light amount control unit, and a third area different from the first area and the second area. The correction task corrects one of a luminance and a color of the image signal corresponding to the second area so as to reduce a difference from a corresponding one of a luminance and a color of the image signal corresponding to at least one of the first and third areas.

12 Claims, 7 Drawing Sheets

(56) References Cited

U.S. PATENT DOCUMENTS

| | | | |
|---|---|---|---|
| 2015/0109533 A1* | 4/2015 | Ikeda | H04N 9/643 |
| | | | 348/566 |
| 2019/0124307 A1* | 4/2019 | Oike | H04N 9/3194 |
| 2020/0049982 A1* | 2/2020 | Higashiyama | G09G 3/002 |
| 2020/0394973 A1* | 12/2020 | Ide | G09G 3/002 |
| 2022/0301466 A1* | 9/2022 | Tu | G09G 3/002 |
| 2022/0309967 A1* | 9/2022 | Shishido | H04N 9/3147 |

\* cited by examiner

| | POSITION (dot) | WIDTH (dot) | CORRECTION AMOUNT |
|---|---|---|---|
| FIRST AREA | Xa | Wa | (Ra,Ga,Ba) |
| SECOND AREA | Xb | Wb | (Rb,Gb,Bb) |
| THIRD AREA | Xc | Wc | (0,0,0) |

IMAGE PROCESSING APPARATUS HAVING LIGHT-SHIELDING PLATE, PROJECTION-TYPE DISPLAY APPARATUS, IMAGE PROCESSING METHOD, AND STORAGE MEDIUM TO CORRECT LUMINANCE OR COLOR OF IMAGE SIGNAL

BACKGROUND

Technical Field

One disclosed aspect of the embodiments relates to an image processing apparatus that is used for a projection system that includes a plurality of projection-type display apparatuses.

Description of the Related Art

In a projection system that includes a plurality of projection-type display apparatuses, there has conventionally been known a method of displaying a single projection image by displaying a plurality of projection images so that the plurality of projection images partially overlap each other. However, an area where the plurality of projection images partially overlap each other (superimposed area) has a luminance higher than that of another area, and a boundary part becomes bright and stands out. Japanese Patent No. ("JP") 3965818 proposes a technique for reducing a luminance difference (difference in luminance) at the boundary part by controlling a light amount in the superimposed area using a light amount control unit and by correcting an image signal according to the luminance of the superimposed area after the light amount is controlled.

In a case where a general light-shielding plate or a light-shielding plate having a sawtooth shape at the end is used for the light amount control unit, the luminance difference also occurs in an area adjacent to the superimposed area due to light diffractions. If the light amount control unit has a multilayer structure, the luminance difference can be improved, but the light amount control unit has a complicated structure.

Since the technique disclosed in JP 3965818 corrects the luminance of the entire projection image by image processing so that it matches the lower limit of the luminance of the superimposed area, the projection image entirely gets dark in a case where the lower limit of the luminance of the superimposed area is small.

SUMMARY

One aspect of the embodiments provides an image processing apparatus that can reduce a luminance difference at a boundary part between a plurality of projection images in a case where a projected light amount to an area where the plurality of projection images partially overlap each other is controlled by using a light amount control unit having a simple structure.

An image processing apparatus according to one aspect of the embodiments is used for a projection system that includes a first projection-type display apparatus configured to project a first projection image so that the first projection image and a second projection image partially overlap each other on a projected surface, a second projection-type display apparatus configured to project the second projection image, a light amount control unit disposed between the projected surface and the first projection-type display apparatus, and configured to control a projected light amount. The image processing apparatus includes at least one processor and at least a memory containing instructions that, when executed by the at least one processor, cause the at least one processor to perform operations including a correction task configured to correct an image signal that has been input to the first projection-type display apparatus. The first projection image includes a first area which part of the second projection image overlaps, a second area that is adjacent to the first area and affected by the light amount control unit, and a third area different from the first area and the second area. The correction task corrects one of a luminance and a color of the image signal corresponding to the second area so as to reduce a difference from a corresponding one of a luminance and a color of the image signal corresponding to at least one of the first area and the third area.

A projection-type display apparatus according to another aspect of the embodiments includes a light modulation element configured to modulate light from a light source, and the above image processing apparatus. An image processing method corresponding to the above image processing apparatus and a storage medium storing a computer program that causes a computer to execute the image processing method also constitute another aspect of the embodiments.

Further features of the disclosure will become apparent from the following description of exemplary embodiments with reference to the attached drawings.

DESCRIPTION OF THE EMBODIMENTS

Figure 1:
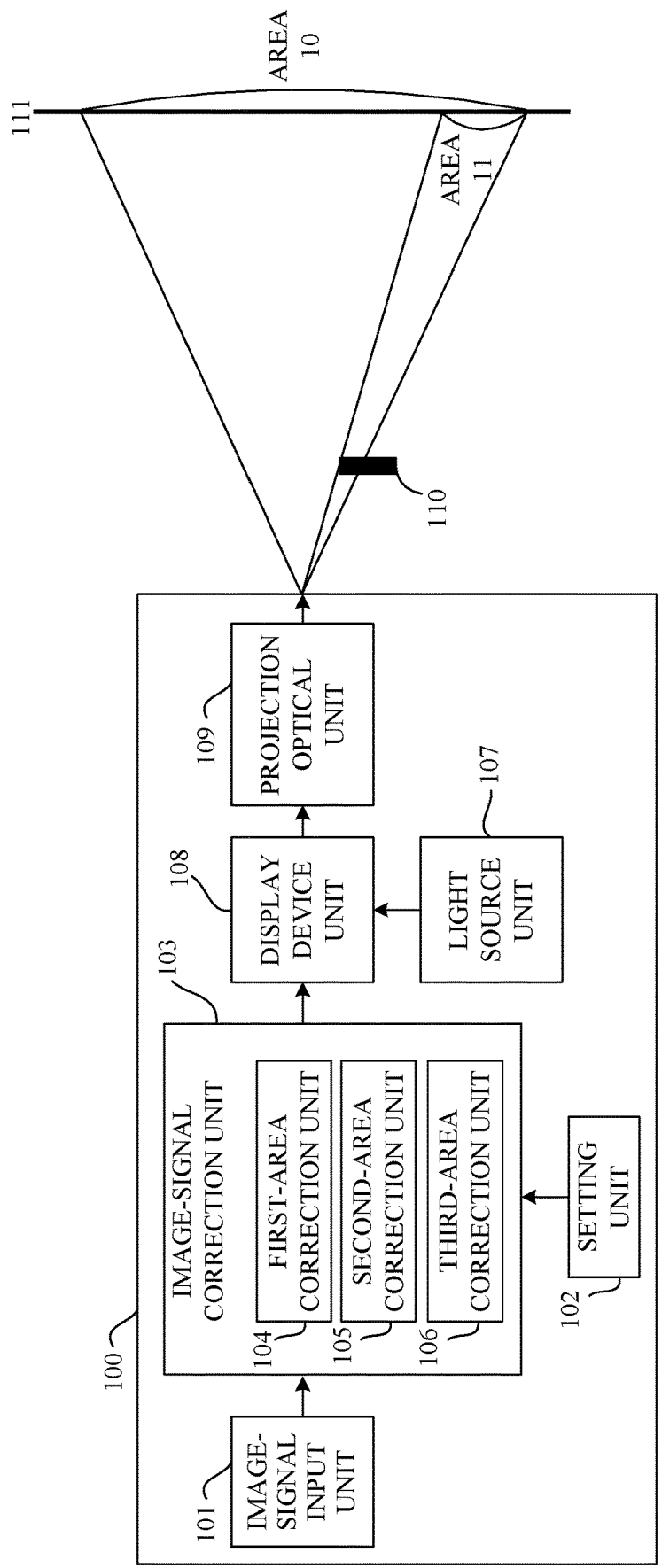
FIG. 1 is a schematic diagram of a projection system that includes an image processing apparatus according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a schematic diagram of a projection system that includes an image processing apparatus according to this embodiment. In the following the term "unit" may refer to: (1) a hardware element such as a circuit, a device, or a processor; or (2) an operation or a software element such as a procedure, an algorithm, a functionality, a function, a module; or (3) a combination of (1) and (2). The projection system includes a plurality of projection-type display apparatuses and a plurality of light amount control units. In this embodiment, the plurality of projection-type display apparatuses includes a projection-type display apparatus 100 and a projection-type display apparatus 200 (shown in FIG. 3). The plurality of light amount control units includes a light amount control unit 110 and a light amount control unit 210 (shown in FIG. 3). The projection-type display apparatus 100 includes an image-signal input unit 101, a setting unit 102, an image-signal correction unit (correction task) 103, a light source unit 107, a display device unit 108, and a projection optical unit 109. Since the projection-type display apparatus 200 has the same configuration as that of the projection-type display apparatus 100, a description thereof will be omitted in this embodiment. Since the light amount control unit 210 has the same configuration as that of the light amount control unit 110, a description thereof will be omitted in this embodiment.

The image-signal input unit 101 is an input terminal for an image signal such as High-Definition Multimedia Interface (HDMI) (registered trademark), Digital Visual Interface (DVI), and DisplayPort. The image-signal input unit 101 is connected to an image-signal output apparatus such as a personal computer and a video player. The image-signal input unit 101 receives the image signal output from the image-signal output apparatus and outputs a received image signal to the image-signal correction unit 103.

The setting unit 102 acquires a set value as a correction parameter when the image-signal correction unit 103 corrects the image signal. In this way, the setting unit 102 functions as an acquisition unit (acquisition task) that acquires a correction parameter (correction amount). The set value may include, for example, information such as a coordinate and a width about a plurality of areas in each projection image, a correction amount for each of RGB signals of the image signal of each area, and the like. The set information may be set by a user via an external user interface such as a remote controller and a mouse, or an operation unit such as a display apparatus provided in the projection-type display apparatus 100, or may be set by an external apparatus.

The image-signal correction unit 103 includes a first-area correction unit 104, a second-area correction unit 105, and a third-area correction unit 106. The image-signal correction unit 103 divides the image signal that has been input to the image-signal input unit 101 into a plurality of areas of each projection image, and corrects image signals of the plurality of areas so as to make inconspicuous an area (superimposed area) in which the plurality of projection images partially overlap each other. The image-signal correction unit 103 outputs a corrected image signal to the display device unit 108. While the image-signal correction unit 103 is mounted in the projection-type display apparatus 100 in this embodiment, the image-signal correction unit 103 may be configured as an image processing apparatus separate from the projection-type display apparatus 100.

In this embodiment, the image-signal correction unit 103 corrects the image signal using the correction amount included in the set value acquired by the setting unit 102. The image-signal correction unit 103 may calculate the correction amount using information about the plurality of areas included in the set value acquired by the setting unit 102, and may correct the image signal using the calculated correction amount. The external apparatus or the image-signal correction unit 103 may calculate the correction amount so that a difference of at least one of the luminance and color between the plurality of areas is smaller than a predetermined value.

The light source unit 107 includes a light emitter such as a Light Emitting Diode (LED) and a semiconductor laser, and outputs light to the display device unit 108.

The display device unit 108 includes an optical modulation device (optical modulation element) having a large number of pixels such as a liquid crystal panel and a digital mirror apparatus (DMD). In a case where the display device unit 108 is of a three-panel type, the display device unit 108 separates a color of light that is output from the light source unit 107 into three colors Red Green Blue (RGB), and modulates each separated light using the optical modulation device according to the image signal of each color. In a case where the display device unit 108 is of a single-panel type, the display device unit 108 modulates color sequential type light that is output from the light source unit 107 using the optical modulation device according to the image signal of each color. The display device unit 108 combines modulated light beams and outputs the combined light to the projection optical unit 109.

The projection optical unit 109 includes a projection lens, projects the light modulated by the display device unit 108 onto a screen 111 (projected surface) via the projection lens, and performs a focus control, a zoom control, and the like.

The light amount control unit 110 is disposed between the projection-type display apparatus 100 and the screen 111, and optically controls a projected light amount. The light amount control unit 110 is a light amount control device such as a light-shielding plate, and restrains the superimposed area from being bright and conspicuous by attenuating the projected light to the superimposed area. An area 10 is an area of a projection image projected on the screen 111 by the projection-type display apparatus 100. An area 11 is part of the area 10 in which light is attenuated by the light amount control unit 110.

Figure 2A:
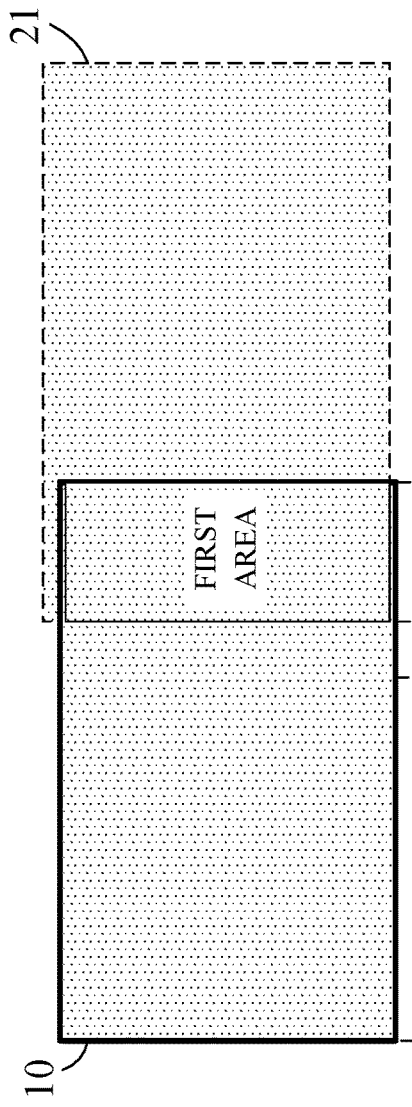
FIGS. 2A to 2C explain a light amount control operation of projected light from a projection-type display apparatus by a light amount control unit according to the first embodiment.
Figure 2B:
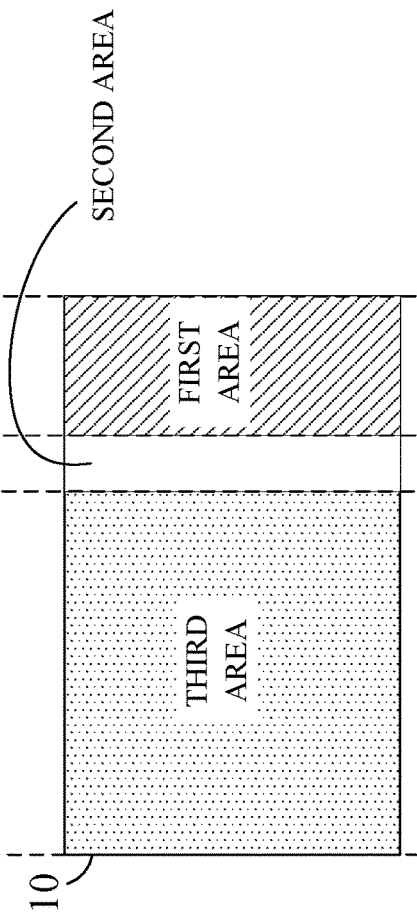
Figure 2C:
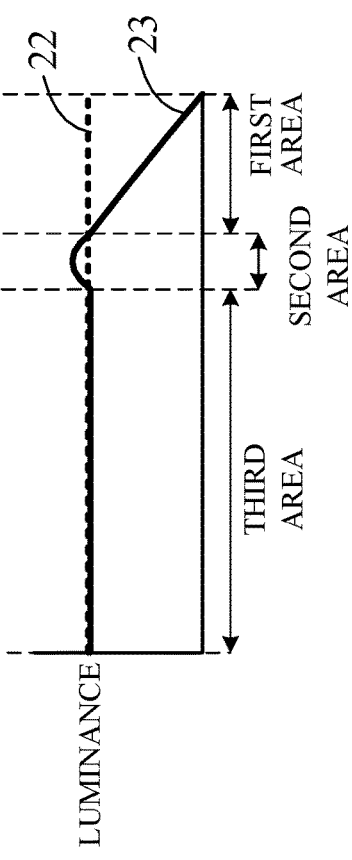

FIGS. 2A to 2C explain a light amount control operation of the light projected by the projection-type display apparatus 100 by the light amount control unit 110. As illustrated in FIG. 2A, a first area is an area (superimposed area) in which the area 10 corresponding to the projection image made by the projection-type display apparatus 100 on the screen 111 and an area 21 corresponding to the projection image made by the projection-type display apparatus 200 on the screen 111 overlap each other. When the light amount control unit 110 is disposed as illustrated in FIG. 1 so as to block part of the projected light, a light attenuation amount changes according to the position of the light amount control unit 110 due to the influence of the light diffraction.

FIG. 2B illustrates the plurality of areas of the projection image in a case where an amount of the light projected by the projection-type display apparatus 100 is controlled by the light amount control unit 110. The first area is an area where the plurality of projection images partially overlap each other, and is an area having a light amount that is attenuated by the light amount control unit 110. The second area is adjacent to the first area and is an area where the plurality of projection images do not overlap each other but which is affected by the light amount control unit 110. The third area is an area in which the projection images projected by the plurality of projection-type display apparatuses do not overlap each other and which is not affected by the light amount control unit 110.

FIG. 2C illustrates luminances in the plurality of areas of the projection image in a case where an amount of the light projected by the projection-type display apparatus 100 is controlled by the light amount control unit 110. A horizontal axis represents a position in a horizontal direction in FIG. 2B, and a vertical axis represents the luminance A broken line 22 illustrates a luminance before the light amount is controlled by the light amount control unit 110, and a solid line 23 illustrates a luminance after the light amount is controlled by the light amount control unit 110. In the solid line 23, in the first area, the luminance decreases (a light attenuation amount increases) from inside to outside. That is, the left end of the first area does not become dark, but the first area becomes darker as the position approaches the right end. The second area is brighter than the third area due to the influence of the light diffraction, and may be viewed as vertical lines.

Figure 3:
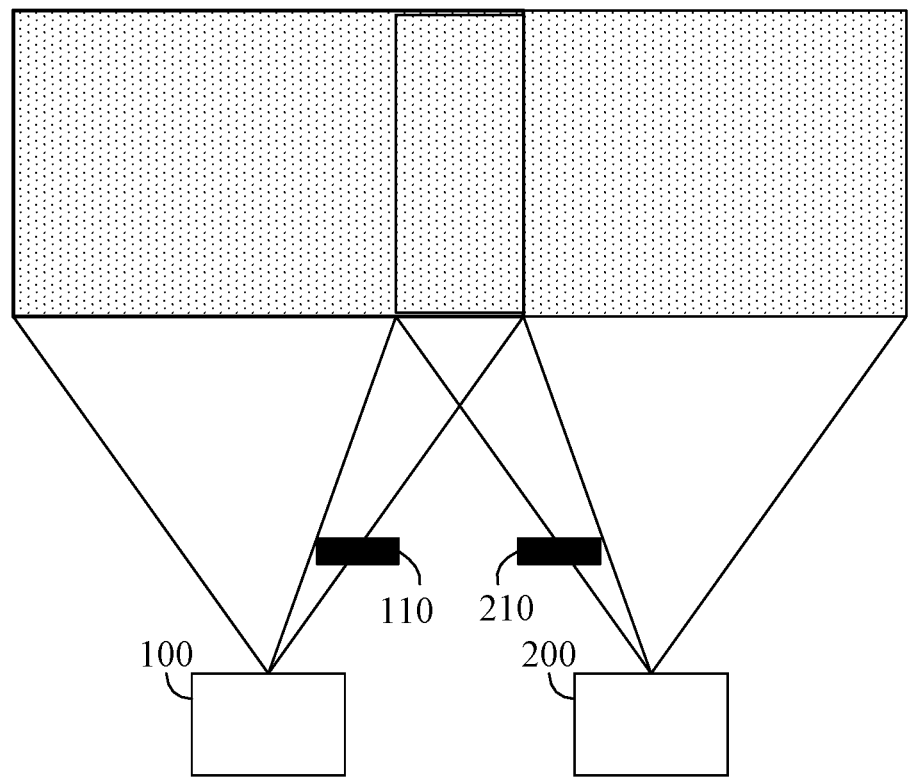
FIG. 3 is a layout diagram of the projection system according to the first embodiment.
Figure 4:
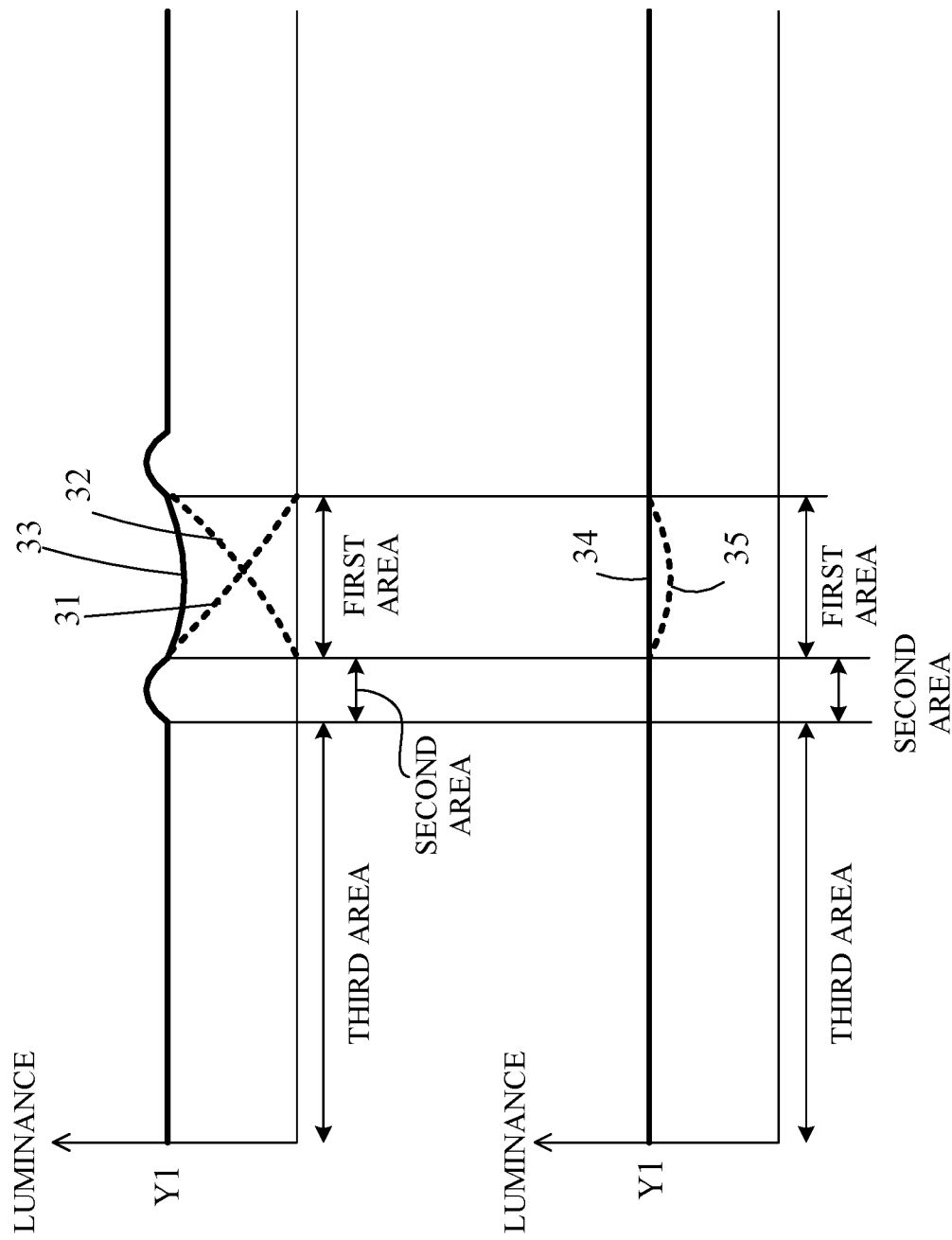
FIGS. 4A and 4B illustrate a luminance section of a projection image according to the first embodiment.

Referring now to FIGS. 3, 4A, and 4B, a description will be given of an operation of the image-signal correction unit 103. FIG. 3 is a layout diagram of the projection system. In FIG. 3, the projection image (first projection image) made by the projection-type display apparatus 100 (first projection-type display apparatus) and the projection image (second projection image) made by the projection-type display apparatus 200 (second projection-type display apparatus) partially overlap each other and form a single projection image on the screen. The light amount control unit 110 attenuates a light amount in an area on the right side of the projection image made by the projection-type display apparatus 100, and the light amount control unit 210 attenuates a light amount in an area on the left side of the projection image made by the projection-type display apparatus 200.

A description will now be given of a case where both the projection-type display apparatuses 100 and 200 display white images in the projection system illustrated in FIG. 3.

FIG. 4A illustrates a luminance section in the horizontal direction in FIG. 3 of the projection image on the screen before the image signal is corrected by the image-signal correction unit provided in each projection-type display apparatus. FIG. 4B illustrates a luminance section in the horizontal direction in FIG. 3 of the projection image on the screen after the image signal is corrected by the image-signal correction unit provided in each projection-type display apparatus.

In FIG. 4A, the light amount of the projection image made by the projection-type display apparatus 100 in the first area is attenuated by the light amount control unit 110 to have a luminance distribution illustrated by a broken line 31. The light amount of projection image made by the projection-type display apparatus 200 in the first area is attenuated by the light amount control unit 210 to have a luminance distribution illustrated by a broken line 32. A solid line 33 indicates a luminance distribution of the projection image after its light amount is controlled by each light amount control unit. In the solid line 33, the luminance distribution in the first area corresponds to a luminance distribution in which the broken line 31 and the broken line 32 are superimposed on each other. The luminance of the second area that is affected by the light amount control unit 110 is higher than that of the third area that is not affected by the light amount control unit 110.

In FIG. 4B, a solid line 34 represents a luminance distribution of the projection image on the screen after the image signal is corrected. As illustrated by the solid line 34, the first-area correction unit 104 performs processing of increasing a level of the image signal so that the luminance of the first area approaches a luminance Y1 of the third area. If the level of the image signal has already reached the maximum value, the first-area correction unit 104 cannot raise the level of the image signal so that the luminance of the first area approaches the luminance Y1, and thus the luminance is not corrected as illustrated by a broken line 35. As illustrated by the solid line 34, the second-area correction unit 105 performs processing of lowering the level of the image signal so as to reduce a luminance difference between the first area and the third area adjacent to the second area. The third-area correction unit 106 does not perform processing of correcting the image signal in the example of FIG. 4B, but it may correct the image signal may be corrected so as to reduce a luminance difference between the second area and part of the third area close to the second area in a case where a luminance difference is generated at the boundary with the second area. The image processing unit provided in the projection-type display apparatus 200 performs similar processing. As a result, the luminance distribution of the projection image on the screen is as illustrated by the solid line 34 or the broken line 35, and the luminance difference at the boundary part is reduced.

Figure 5:
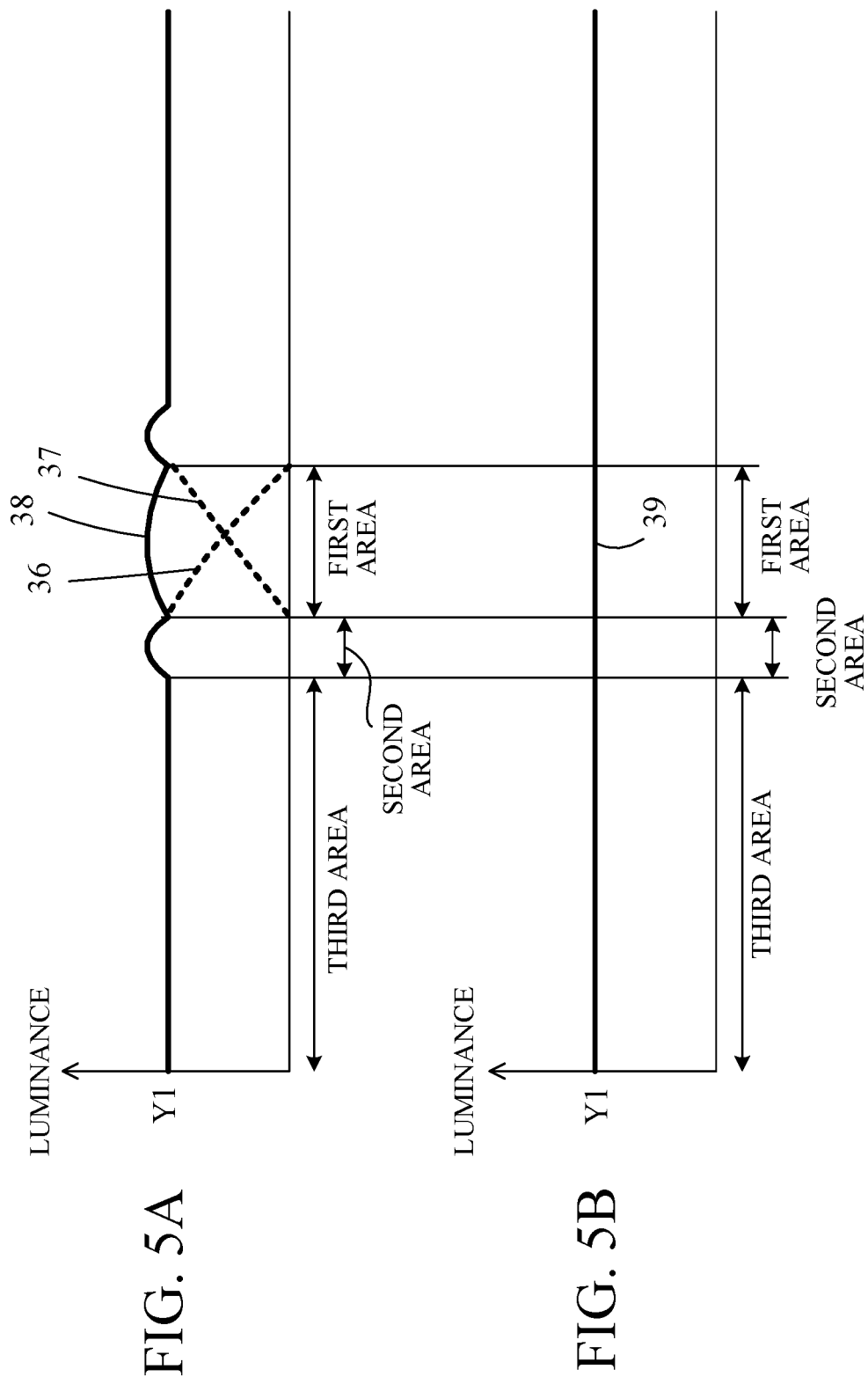
FIGS. 5A and 5B illustrate the luminance section of the projection image according to the first embodiment.

FIG. 5A illustrates a luminance section in the horizontal direction in FIG. 3 of the projection image on the screen before the image signal is corrected by the image-signal correction unit provided in each projection-type display apparatus in a case where the superimposed area becomes bright. FIG. 5B illustrates a luminance section in the horizontal direction in FIG. 3 of the projection image on the screen after the image signal is corrected by the image-signal correction unit provided in each projection-type display apparatus in a case where the superimposed area becomes bright.

In FIG. 5A, a light amount of the projection image made by the projection-type display apparatus 100 in the first area is attenuated by the light amount control unit 110 to have a luminance distribution illustrated by a broken line 36. A light amount of the projection image made by the projection-type display apparatus 200 in the first area is attenuated by the light amount control unit 210 to have a luminance distribution illustrated by a broken line 37. A solid line 38 represents a luminance distribution of the projection image after its light amount is controlled by the light amount control unit.

In FIG. 5B, a solid line 39 represents a luminance distribution of the projection image on the screen after the image signal is corrected. As illustrated by the solid line 39, the first-area correction unit 104 performs processing of lowering the level of the image signal so that the luminance of the first area approaches the luminance Y1 of the third area. As illustrated by the solid line 39, the second-area correction unit 105 performs processing of lowering the level of the image signal so as to reduce the luminance difference between the first area and the third area adjacent to the second area. In the example of FIG. 5B, the third-area correction unit 106 does not perform processing of correcting the image signal. The image processing unit provided in the projection-type display apparatus 200 performs similar processing. As a result, the luminance distribution of the projection image on the screen is as illustrated by the solid line 39, and the luminance difference at the boundary part is reduced.

As described above, the configuration according to this embodiment corrects the luminance difference that occurs in the area adjacent to the superimposed area due to the influence of the light amount control unit, using the image signal, and thereby corrects the luminance difference at the boundary part between the plurality of projection images. Since the correction is performed so as to reduce the luminance difference between the first area and the third area, the brightness of the third area that is not affected by the light amount control unit can be maintained. Therefore, an area where the projection images do not overlap each other can be displayed while they are maintained bright. This embodiment has described the example in which both the projection-type display apparatuses 100 and 200 display white images, but the disclosure is not limited to this embodiment. For example, in a case where gray or black images are displayed, similar to the case of displaying the white image, the luminance difference at the boundary part between the plurality of projection images can be reduced by correcting the image signals corresponding to the first to third areas.

Second Embodiment

This embodiment will discuss an example in which the correction amount of the image signal by the image-signal correction unit 103 is adjusted based on an instruction of a user. The projection system according to this embodiment has the same basic configuration as that of the projection system of the first embodiment. This embodiment will mainly describe a configuration different from that of the first embodiment, and a description of the same configuration as that of the first embodiment will be omitted.

Figure 6:
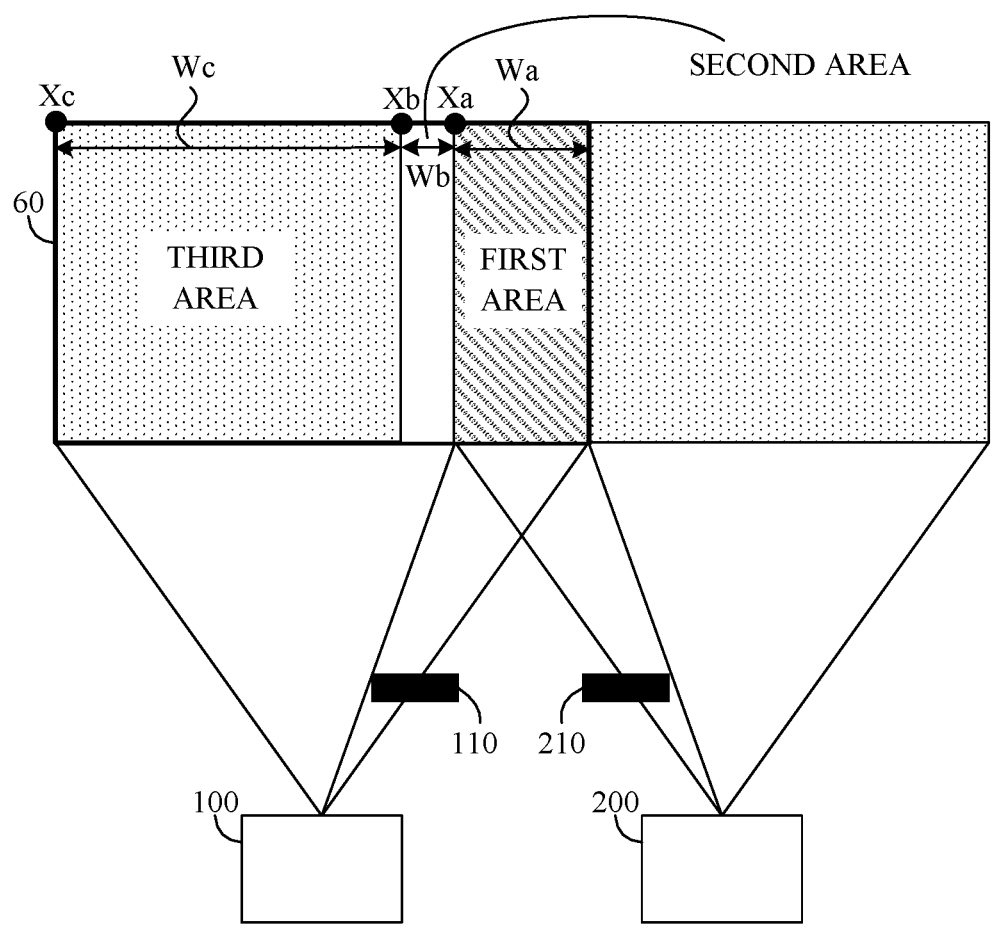
FIG. 6 is a layout diagram of a projection system according to a second embodiment.

FIG. 6 is a layout diagram of the projection system. In FIG. 6, a projection image 60 made by the projection-type display apparatus 100 and a projection image made by the projection-type display apparatus 200 partially overlap each other and form a single projection image on the screen. The light amount control unit 110 attenuates a light amount in an area on the right side of the projection image 60 made by the projection-type display apparatus 100, and the light amount control unit 210 attenuates a light amount in an area on the left side of the projection image made by the projection-type display apparatus 200.

The projection image 60 made by the projection-type display apparatus 100 has a first area, a second area, and a third area. The first area is an area that overlaps the projection image made by the projection-type display apparatus 200 and has a light amount attenuated by the light amount control unit 110. The second area is adjacent to the first area and is an area where the projection image 60 made by the projection-type display apparatus 100 and the projection image made by the projection-type display apparatus 200 do not overlap each other, but the second area is affected by the light amount control unit 110. The third area is an area in which the projection image 60 made by the projection-type display apparatus 100 and the projection image made by the projection-type display apparatus 200 do not overlap each other and the third area is not affected by the light amount control unit 110.

Figures 7, 8:
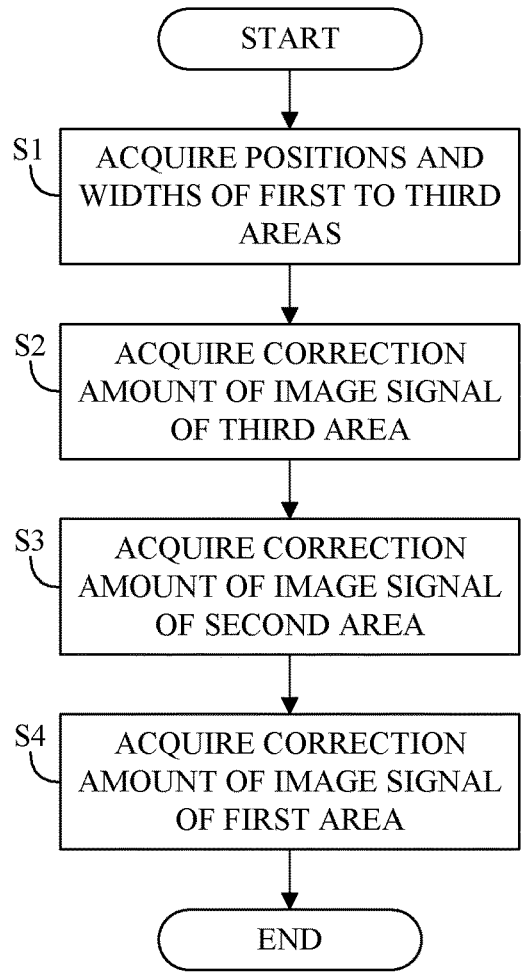
FIG. 7 illustrates an operation flow in a case where the image signal according to the second embodiment is adjusted.
FIG. 8 illustrates an example of set values according to the second embodiment.

FIG. 7 illustrates an operation flow when the user adjusts the image signal corresponding to each area so as to reduce the luminance difference at the boundary part between respective areas.

In step S1, the setting unit 102 acquires positions and widths of the first to third areas set by the user via the remote controller or the like. The position is, for example, a horizontal position (dot) of the upper left point of each area. FIG. 8 is a table that illustrates an example of set values acquired by the setting unit 102. In this embodiment, the positions of the first to third areas are expressed by Xa, Xb, and Xc, respectively, and the widths of the first to third areas are expressed by Wa, Wb, and Wc, respectively.

In step S2, the setting unit 102 acquires the correction amount for each of RGB of the image signal corresponding to the third area in which the plurality of projection images that have been set by the user via the remote controller and the like do not overlap each other and which is not affected by the light amount control unit 110. In this embodiment, since the third area is not affected by the light amount control unit 110, the correction amount for each of RGB of the image signal corresponding to the third area is set to "0" as illustrated in FIG. 8.

In step S3, the setting unit 102 acquires a correction amount (Rb, Gb, Bb) for each of RGB of the image signal corresponding to the second area in which the plurality of projection images that have been set by the user via the remote controller or the like do not overlap each other but which is affected by the light amount control unit 110. For example, in a case where the second area is brighter than the third area due to the influence of the light amount control unit 110, the correction amount (Rb, Gb, Bb) is set so as to reduce the luminance difference from the third area. In a case where coloring occurs in the second area due to the influence of the light amount control unit 110, the correction amount (Rb, Gb, Bb) is set so as to make inconspicuous the color difference (difference in color) at the boundary part with the third area (so that the second area and the third area have equivalent colors).

In step S4, the setting unit 102 acquires the correction amount for each of RGB (Ra, Ga, Ba) of the image signal corresponding to the first area in which the plurality of projection images set by the user via the remote controller or the like partially overlap each other. For example, in a case where the first area is brighter than the second area, the correction amount (Ra, Ga, Ba) is set so as to reduce the luminance difference between the first area and the second area. In a case where coloring occurs in the first area due to the influence of the light amount control unit 110, the correction amount (Ra, Ga, Ba) is set so as to make conspicuous the color difference at the boundary part between the first area and the second area.

As described above, the configuration according to this embodiment can reduce differences in luminance and/or color that are generated in the area adjacent to the superimposed area by the light amount control unit when the user sets the set value. In this embodiment, the user sets the set value via the remote controller, but the disclosure is not limited to this embodiment. A measurement apparatus may be used to measure at least one of the luminance and the color of the projection image projected on the projected surface. For example, the projection image on the screen may be captured by a camera (measurement apparatus), and the set value may be set using the captured image.

Each of the above embodiment can provide the image processing apparatus that can reduce the luminance difference at the boundary part between the plurality of projection images, in a case where the projected light amount to the area where the plurality of projection images partially overlaps is controlled by using a light amount control unit having a simple structure.

Other Embodiments

Embodiment(s) of the disclosure can also be realized by a computer of a system or apparatus that reads out and executes computer executable instructions (e.g., instructions or one or more programs) stored or contained in a memory or recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-065726, filed on Apr. 8, 2021, which is hereby incorporated by reference herein in its entirety.

What is claimed is:

1. An image processing apparatus for use with a projection system that includes a first projection-type display apparatus configured to project a first projection image so that the first projection image and a second projection image partially overlap each other on a projected surface, a second projection-type display apparatus configured to project the second projection image, and a light-shielding plate disposed between the projected surface and the first projection-type display apparatus, and configured to reduce a projected light amount on an overlapped area of the first projection image and the second projection image of the projected surface, the image processing apparatus comprising:
at least one processor and
at least a memory containing instructions that, when executed by the at least one processor, cause the at least one processor to perform operations comprising:
a correction task configured to correct an image signal that has been input to the first projection-type display apparatus,
wherein the first projection image includes:
a first area which part of the second projection image overlaps and where a luminance decreases compared to the case where the light-shielding plate is not disposed due to an influence of the light-shielding plate,
a second area that is adjacent to the first area and where a luminance increases compared to the case where the light-shielding plate is not disposed due to the influence of the light-shielding plate, and
a third area different from the first area and the second area, and
wherein when the light-shielding plate is disposed between the projected surface and the first projection-type display apparatus, the correction task corrects one of a luminance and a color of the image signal corresponding to the second area by lowering a level of the image signal corresponding to the second area in accordance with the luminance of the second area so as to reduce a difference from a corresponding one of a luminance and a color of the image signal corresponding to at least one of the first area and the third area.

2. The image processing apparatus according to claim 1, wherein the operations further include an acquisition task configured to acquire a correction amount to the image signal corresponding to the second area, and
wherein the correction task corrects the image signal corresponding to the second area using the correction amount acquired by the acquisition task.

3. The image processing apparatus according to claim 2, wherein the correction amount is set by a user via the acquisition task.

4. The image processing apparatus according to claim 1, wherein the correction task corrects the image signal corresponding to the second area so as to reduce the difference from the luminance and color of at least one of the first area and the third area measured by a measurement apparatus.

5. The image processing apparatus according to claim 1, wherein the correction task lowers the luminance of the image signal corresponding to the second area so as to reduce the difference from the luminance of the image signal corresponding to at least one of the first area and the third area.

6. The image processing apparatus according to claim 1, wherein the correction task can correct the image signal corresponding to each of the first area, the second area, and the third area.

7. The image processing apparatus according to claim 1, wherein the correction task does not correct the image signal corresponding to the third area.

8. The image processing apparatus according to claim 1, wherein the correction task corrects the luminance of the image signal corresponding to the second area so as to reduce a difference from the luminance of the image signal corresponding to at least one of the first area and the third area, and the correction task corrects the color of the image signal corresponding to the second area so as to reduce a difference from the color of the image signal corresponding to at least one of the first area and the third area.

9. The image processing apparatus according to claim 1, wherein the correction task corrects a level corresponding to the luminance of the image signal corresponding to the second area so as to reduce the luminance increased compared to the case where the light-shielding plate is not disposed due to the influence of the light-shielding plate.

10. A projection-type display apparatus comprising:
a light modulation element configured to modulate light from a light source; and
an image processing apparatus for use with a projection system that includes a first projection-type display apparatus configured to project a first projection image so that the first projection image and a second projection image partially overlap each other on a projected surface, a second projection-type display apparatus configured to project the second projection image, and a light-shielding plate disposed between the projected surface and the first projection-type display apparatus, and configured to reduce a projected light amount on an overlapped area of the first projection image and the second projection image of the projected surface, the image processing apparatus comprising at least one processor and at least a memory containing instructions that, when executed by the at least one processor, cause the at least one processor to perform operations comprising:

a correction task configured to correct an image signal that has been input to the first projection-type display apparatus, wherein the first projection image includes:

a first area which part of the second projection image overlaps and where a luminance decreases compared to the case where the light-shielding plate is not disposed due to the influence of the light-shielding plate, a second area that is adjacent to the first area and where a luminance increases compared to the case where the light-shielding plate is not disposed due to the influence of the light-shielding plate, and a third area different from the first area and the second area, and wherein when the light-shielding plate is disposed between the projected surface and the first projection-type display apparatus, the correction task corrects one of a luminance and a color of the image signal corresponding to the second area by lowering a level of the image signal corresponding to the second area in accordance with the luminance of the second area so as to reduce a difference from a corresponding one of a luminance and a color of the image signal corresponding to at least one of the first area and the third area.

11. An image processing method for use with a projection system that includes a first projection-type display apparatus configured to project a first projection image so that the first projection image and a second projection image partially overlap each other on a projected surface, a second projection-type display apparatus configured to project the second projection image, and a light-shielding plate disposed between the projected surface and the first projection-type display apparatus, and configured to reduce a projected light amount on an overlapped area of the first projection image and the second projection image of the projected surface, the image processing method comprising:

correcting an image signal that has been input to the first projection-type display apparatus, wherein the first projection image includes:

a first area which part of the second projection image overlaps and where a luminance decreases compared to the case where the light-shielding plate is not disposed due to the influence of the light-shielding plate, a second area that is adjacent to the first area and where a luminance increases compared to the case where the light-shielding plate is not disposed due to the influence of the light-shielding plate, and a third area different from the first area and the second area, and wherein when the light-shielding plate is disposed between the projected surface and the first projection-type display apparatus, correcting the image signal comprises correcting one of a luminance and a color of the image signal corresponding to the second area by lowering a level of the image signal corresponding to the second area in accordance with the luminance of the second area so as to reduce a difference from a corresponding one of a luminance and a color of the image signal corresponding to at least one of the first area and the third area.

12. A non-transitory computer-readable storage medium storing a computer program that causes a computer to execute the image processing method according to claim 11.

* * * * *